Patented Dec. 8, 1953

2,662,098

UNITED STATES PATENT OFFICE 2,662,098

HALOALKYL SUBSTITUTED CYCLOHEPTA-TRIEN-1-ol-2-ONE RING COMPOUNDS AND METHODS FOR THEIR PREPARATION

Edward G. Howard, Jr., Wilmington, Del., assignor to E. I. du Pont de Nemours and Company, Wilmington, Del., a corporation of Delaware No Drawing. Application June 4, 1951,
Serial No. 229,879

18 Claims. (Cl. 260—586)

This invention relates to new compositions of matter and to a method for their preparation. More particularly this invention relates to a new class of compounds containing a seven-membered carbocyclic ring and to a novel process for their preparation.

Compounds containing seven-membered rings occur in several natural products. Such compounds have been found to possess valuable properties with respect to regulating plant growth as well as for pesticidal applications. Of particular interest are carbocyclic compounds, especially those containing the cycloheptatrien-1-ol-2-one ring. These compounds have unique chemical properties. Cycloheptatrien-1-ol-2-one (tropolone) has received considerable attention in recent years, since the cycloheptatrien-1-ol-2-one ring exists in certain biologically active products, such as colchicine and fungicides including the thujaplicins which are part of the active portions in cedar wood. New compounds containing this ring system which are further susceptible to chemical reactions for the preparation of various substitution products would be a desirable addition to the chemical art and industry.

It is an object of this invention to provide new compositions of matter and methods for their preparation. A further object is to provide a new class of compounds containing a seven-membered carbocyclic ring and a novel process for their preparation. Other objects will appear hereinafter.

The objects of this invention are accomplished by providing a new class of chemical compounds having the cycloheptatrien-1-ol-2-one ring and containing a haloalkyl substituent attached to the ring. These new compounds are the haloalkylcycloheptatrien-1-ol-2-ones, the haloalkyl-halocycloheptatrien-1-ol-2-ones and the haloalkyl-alkylcycloheptatrien-1-ol-2-ones. They are obtained by reacting a compound containing the cycloheptatrien-1-ol-2-one ring, such as cycloheptatrien-1-ol-2-one, an alkylcycloheptatrien-1-ol-2-one or a halocycloheptatrien-1-ol-2-one, with a haloalkylating agent, e. g., a hydrogen halide and a lower alkane aldehyde.

A particularly preferred process for the preparation of a chloroalkylcycloheptatrien-1-ol-2-one product of this invention involves the reaction of tropolone, or a derivative of tropolone containing an alkyl or halogen substituent on the carbocyclic ring, with a chloromethylating agent and preferably with formaldehyde and hydrochloric acid.

Tropolone, cycloheptatrien-1-ol-2-one, has the structural formula

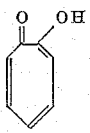

The new compounds of this invention include the haloalkyltropolones having the general structural formula

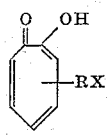

wherein RX is haloalkyl, particularly chloroalkyl and bromoalkyl wherein the halogen atom in said haloalkyl group is attached to the carbon atom alpha to the tropolone ring. The preferred haloalkyltropolones are those in which the haloalkyl group contains from 1 to 4 carbon atoms. Also included among the new compounds of this invention are the seven-membered carbocyclic ring compounds consisting of the cycloheptatrien-1-ol-2-one ring having a haloalkyl substituent and also an alkyl or halogen substituent on the ring and having the general structural formula wherein Y is alkyl, preferably of 1 to 3 carbon atoms, or halogen, preferably bromine or chlorine, and RX is haloalkyl, particularly chloroalkyl or bromoalkyl of 1 to 4 carbon atoms wherein the halogen atom in said haloalkyl group is attached to the carbon atom alpha to the cycloheptatrien-1-ol-2-one ring. When Y is hydrogen the compound is a haloalkyltropolone.

The following examples in which the parts are by weight further illustrates this invention.

*Example I*

Cycloheptatrien-1-ol-2-one was prepared by the process of Cook et al., Chem. and Ind. 1950, 427, by the bromination of cycloheptanedione-1,2 to the bromo derivative, followed by reduction to the desired compound. A mixture of 1.22 parts of the cycloheptatrien-1-ol-2-one, 7.5 parts of concentrated hydrochloric acid, and 1.06 parts of 37% formaldehyde was heated at reflux (70–80°

C.) for seven hours. After standing for sixteen hours, 25 parts of water was added. A yellow solid precipitated and was recrystallized from petroleum ether. This solid, which amounted to 0.15 part, was slightly soluble in water and this solution gave a green color with 5% ferric chloride solution. The crystalline product melted at 149–152° C. after softening at 145° C. This compound was chloromethylcycloheptatrien-1-ol-2-one, (chloromethyltropolone), and had the following analysis:

Calculated for $C_8H_7O_2Cl$: C, 56.32%; H, 4.14%; Cl, 20.78%
Found: C, 56.55%; H. 4.22%; Cl, 20.63%

The filtrate obtained from the reaction mixture was extracted with chloroform. Removal of the chloroform by evaporation gave 0.9 part of recovered cycloheptatrien-1-ol-2-one.

*Example II*

A mixture of 2.01 parts of 3-bromocycloheptatrien-1-ol-2-one, 2.12 parts of 37% formaldehyde and 14 parts of conc. hydrochloric acid was heated on a steam bath for 5 hours during which time needle-like crystals formed. The solid material was collected by filtration and amounted to 0.5 part. Two crystallizations from cyclohexane gave a product melting at 129–130° C. which was chloromethyl-3-bromocycloheptatrien-1-ol-2-one and had the following analysis:

Calculated for 1 g. of $C_8H_6O_2BrCl$ to give 1.327 g. silver halide
Found: 1.328 g.

A total of 1.1 part of the unreacted 3-bromocycloheptatrien-1-ol-2-one was recovered when the acidic formaldehyde solution was poured into water.

Simple substitution products of cycloheptatrien-1-ol-2-one can be used in preparing the products of this invention. The most suitable and preferred are those which contain an alkyl of 1 to 3 carbons or a halogen, particularly bromine and chlorine, as substituent on the carbocyclic ring. Thus there can be used alkylcycloheptatrien-1-ol-2-ones, such as methyl, ethyl and propylcycloheptatrien-1-ol-2-ones and halocycloheptatrien-1-ol-2-ones, such as chloro- and bromocycloheptatrien-1-ol-2-ones. Of these, those having the formula

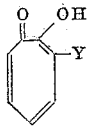

wherein Y is hydrogen, chlorine or bromine are preferred.

Haloalkylating agents that can be used are those which contain a halogen of atomic number of 17 to 35. These include bromomethyl ether, chloromethyl ether, and mixtures of hydrobromic or hydrochloric acid with an alkanal of 1 to 4 carbons, e. g., butyraldehyde and particularly with formaldehyde as illustrated in the examples. The exact conditions of reaction depend upon the specific haloalkylating agent employed and the temperature. The temperature is usually from 25–100° C. With hydrochloric acid/formaldehyde mixtures temperatures of 50 to 100° C. are useful. Satisfactory yields are obtained at a temperature of about 75° C. when the time of reaction is 4 to 10 hours or more.

With mixtures of alkanals and hydrohalogen acids the molar ratios of these reactants should be at least 1:1 for each mole of the cycloheptatrienolone. Larger amounts of aldehyde and acid can be employed with molar ratios of as high as 10 per mole of the cycloheptatrienolone. Catalysts which generally aid in this reaction include zinc chloride, sulfuric acid, and acetic acid in small amounts.

With the use of the above reactants there can be prepared chloroalkylcycloheptatrien-1-ol-2-ones and bromoalkylcycloheptatrien-1-ol-2-ones such as chloromethyl, chloroethyl, chloropropyl, chlorobutyl, bromomethyl, bromoethyl, bromopropyl, and bromobutylcycloheptatrien-1-ol-2-ones. The haloalkylcycloheptatrien-1-ol-2-ones in which the haloalkyl substituent contains 1 to 4 carbon atoms are preferred. As is apparent from the haloalkylating reaction employing an alkanal with halogen acid, the halogen atom is attached to that carbon atom of the haloalkyl group which is alpha to the cycloheptatrien-1-ol-2-one ring.

There can also be prepared haloalkylcycloheptatrien-1-ol-2-ones having alkyl or halogen substituents on the ring. Examples of the latter are the chloromethyl-3-bromocycloheptatrien-1-ol-2-ones, the chloromethyl-3-chlorocycloheptatrien-1-ol-2-ones and the chloromethylpropylcycloheptatrien-1-ol-2-ones. Particularly preferred are the compounds of the formula

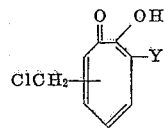

wherein Y is hydrogen or a halogen of atomic number of 17 to 35.

The haloalkylcycloheptatrien-1-ol-2-ones and particularly chloromethylcycloheptatrienolone obtained by the process of this invention can be employed in the formulation of biologically active products, e. g., pesticidal, fungicidal, or plant regulant uses. The compounds of this invention are valuable as intermediates, e. g., the halogen in the haloalkyltropolones is susceptible to replacement by other groups to provide substituted cycloheptatrienolone compounds.

As many apparently widely different embodiments of this invention may be made without departing from the spirit and scope thereof, it is to be understood that this invention is not limited to the specific embodiments thereof except as defined in the appended claims.

I claim:

1. A process for preparing a chloromethylcycloheptatrien-1-ol-2-one which comprises reacting cycloheptatrien-1-ol-2-one with hydrochloric acid and formaldehyde.

2. A process for preparing a chloromethyl-3-bromocycloheptatrien-1-ol-2-one which comprises reacting 3-bromocycloheptatrien-1-ol-2-one with hydrochloric acid and formaldehyde.

3. A process which comprises reacting a member selected from the class consisting of cycloheptatrien-1-ol-2-one, alkylcycloheptatrien-1-ol-2-ones wherein the alkyl group contains 1 to 3 carbon atoms, bromocycloheptatrien-1-ol-2-ones, and chlorocycloheptatrien-1-ol-2-ones with formaldehyde and a hydrogen halide selected from the class consisting of hydrochloric and hydrobromic acids.

4. A process which comprises reacting a member selected from the class consisting of cycloheptatrien-1-ol-2-one, alkylcycloheptatrien-1-ol-2-ones wherein the alkyl group contains 1 to 3 carbon atoms, bromocycloheptatrien-1-ol-2-ones and chlorocycloheptatrien-1-ol-2-ones with a lower alkane aldehyde of from 1 to 4 carbon atoms and a hydrogen halide selected from the class consisting of hydrochloric and hydrobromic acids.

5. A process for preparing a chloroalkylcycloheptatrien-1-ol-2-one wherein the chloroalkyl group contains 1 to 4 carbon atoms which comprises reacting cycloheptatrien-1-ol-2-one with hydrochloric acid and a lower alkane aldehyde of from 1 to 4 carbon atoms.

6. A process for preparing a bromoalkylcycloheptatrien-1-ol-2-one wherein the bromoalkyl group contains 1 to 4 carbon atoms which comprises reacting cycloheptatrien-1-ol-2-one with hydrobromic acid and a lower alkane aldehyde of from 1 to 4 carbon atoms.

7. A process which comprises reacting a bromocycloheptatrien-1-ol-2-one with a lower alkane aldehyde of 1 to 4 carbon atoms and a hydrogen halide selected from the class consisting of hydrochloric and hydrobromic acids.

8. A process which comprises reacting a chlorocycloheptatrien-1-ol-2-one with a lower alkane aldehyde of 1 to 4 carbon atoms and a hydrogen halide selected from the class consisting of hydrochloric and hydrobromic acids.

9. A chemical compound containing the cycloheptatrien-1-ol-2-one ring and having the general formula

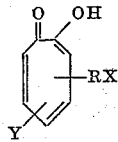

wherein Y is selected from the class consisting of hydrogen, bromine, chlorine and alkyl of 1 to 3 carbon atoms and RX is a haloalkyl group selected from the class consisting of bromoalkyl and chloroalkyl groups of 1 to 4 carbon atoms wherein the halogen atom is attached to the carbon atom alpha to the cycloheptatrien-1-ol-2-one ring.

10. A chemical compound containing the cycloheptatrien-1-ol-2-one ring and having the general formula

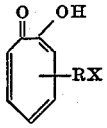

wherein RX is a chloroalkyl group of 1 to 4 carbon atoms wherein the chlorine atom is attached to the carbon atom alpha to the cyclopentatrien-1-ol-2-one ring.

11. Chloromethylcycloheptatrien-1-ol-2-one.

12. A chemical compound containing the cycloheptatrien-1-ol-2-one ring and having the general formula

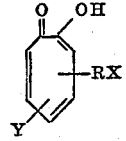

wherein Y is bromine and RX is a chloroalkyl group of 1 to 4 carbon atoms wherein the chlorine atom is attached to the carbon atom alpha to the cycloheptatrien-1-ol-2-one ring.

13. A chemical compound containing the cycloheptatrien-1-ol-2-one ring and having the general formula

wherein Y is bromine and RX is chloromethyl.

14. Chloromethyl - 3 - bromocycloheptatrien-1-ol-2-one.

15. A chemical compound containing the cycloheptatrien -1-ol-2-one ring and having the general formula

wherein Y is chlorine and RX is a chloroalkyl group of 1 to 4 carbon atoms wherein the chlorine atom is attached to the carbon atom alpha to the cycloheptatrien-1-ol-2-one ring.

16. A chemical compound containing the cycloheptatrien-1-ol-2-one ring and having the general formula wherein Y is chlorine and RX is chloromethyl.

17. A chemical compound containing the cycloheptatrien-1-ol-2-one ring and having the general formula wherein RX is a bromoalkyl group of 1 to 4 carbon atoms wherein the bromine atom it attached to the carbon atom alpha to the cycloheptatrien-1-ol-2-one ring.

18. A chemical compound containing the cycloheptatrien-1-ol-2-one ring and having the general formula wherein RX is bromomethyl.

EDWARD G. HOWARD, Jr.

References Cited in the file of this patent
UNITED STATES PATENTS

| Number | Name | Date |
|---|---|---|
| 2,462,031 | Wittcoff | Feb. 15, 1949 |

OTHER REFERENCES

Adams et al., "Organic Reactions," vol. 1, pages 64–65, 80–81, 83, 89. Published 1942 by John Wiley and Sons, Inc., New York.

Gripenberg et al., Chemical Abstracts, vol. 43, col. 5016, (1949).

Cook et al., Chemistry and Industry of June 3, 1950, page 427.